United States Patent
Xia et al.

(10) Patent No.: US 11,023,466 B2
(45) Date of Patent: Jun. 1, 2021

(54) COST-BASED OPTIMIZER, AND COST ESTIMATION METHOD AND DEVICE THEREOF

(71) Applicant: TRANSWARP TECHNOLOGY (SHANGHAI) CO., LTD., Shanghai (CN)

(72) Inventors: Li Xia, Shanghai (CN); Zhenqiang Chen, Shanghai (CN)

(73) Assignee: TRANSWARP TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/766,480

(22) PCT Filed: Nov. 22, 2018

(86) PCT No.: PCT/CN2018/116874
§ 371 (c)(1),
(2) Date: May 22, 2020

(87) PCT Pub. No.: WO2019/101119
PCT Pub. Date: May 31, 2019

(65) Prior Publication Data
US 2020/0379999 A1 Dec. 3, 2020

(30) Foreign Application Priority Data
Nov. 22, 2017 (CN) .......................... 201711175349.9

(51) Int. Cl.
*G06F 16/2453* (2019.01)
*G06F 16/242* (2019.01)
*G06F 17/18* (2006.01)

(52) U.S. Cl.
CPC ...... *G06F 16/24544* (2019.01); *G06F 16/244* (2019.01); *G06F 17/18* (2013.01)

(58) Field of Classification Search
CPC ... G06F 16/24544; G06F 16/244; G06F 17/18
(Continued)

(56) References Cited

U.S. PATENT DOCUMENTS

| 5,903,888 A | 5/1999 | Cohen et al. |
| 9,031,934 B2 | 5/2015 | Yang et al. |

(Continued)

FOREIGN PATENT DOCUMENTS

| CN | 103136260 A | 6/2013 |
| CN | 106446134 A | 2/2017 |

(Continued)

OTHER PUBLICATIONS

International Search Report for Application No. PCT/CN2018/116874 dated Feb. 22, 2019.
(Continued)

*Primary Examiner* — Robert W Beausoliel, Jr.
*Assistant Examiner* — Arthur Ganger
(74) *Attorney, Agent, or Firm* — Jenkins Wilson Taylor & Hunt, PA (57) ABSTRACT

A cost based optimizer and a cost estimation method and device. The method includes: in response to deciding that acquired statistical information is incomplete, determining a corresponding cost estimation manner according to an operation type of an operation tree relying on the statistical information (S11); determining a cost estimate of the corresponding operation type based on the cost estimation manner (S12); and determining an accumulative cost estimate of the operation tree according to the cost estimate corresponding to the operation type relying on the statistical information and a cost estimate corresponding to an operation type not relying on the statistical information (S13). Therefore, cost estimation may be performed for a tempo-
(Continued)

rary table and a subquery created in a running process, and is not limited by a data scale in a scenario of massive data.

17 Claims, 4 Drawing Sheets

(58) Field of Classification Search
USPC .......................................................... 707/716
See application file for complete search history.

(56) References Cited

U.S. PATENT DOCUMENTS

| | | | |
|---|---|---|---|
| 9,507,822 B2* | 11/2016 | Weissman | G06F 16/242 |
| 2013/0132371 A1 | 5/2013 | Bharath et al. | |
| 2014/0095475 A1* | 4/2014 | Su | G06F 16/24544 |
| | | | 707/718 |
| 2019/0236188 A1* | 8/2019 | McKenna | G06F 16/24544 |

FOREIGN PATENT DOCUMENTS

| | | |
|---|---|---|
| CN | 107025273 A | 8/2017 |
| CN | 107168977 A | 9/2017 |
| CN | 107239541 A | 10/2017 |
| CN | 107885865 A | 4/2018 |
| CN | 107885865 B | 12/2019 |
| EP | 3716093 A1 | 9/2020 |
| WO | WO 2006/071830 A1 | 7/2006 |
| WO | WO 2017/157160 A1 | 9/2017 |
| WO | WO 2019/101119 A1 | 5/2019 |

OTHER PUBLICATIONS

Chinese Office Action for Application No. 201711175349.9 dated May 27, 2019.
Chinese Office Action for Application No. 201711175349.9 dated Aug. 9, 2019.
Tanaka T. et al., Measurement-based Cost Estimation Method of a Join Operation for an In-Mmory Database. *MMEDIA 2017: The Ninth International Conferences on Advances in Multimedia*, Apr. 27, 2017, pp. 57-66.
Chapter 13: Query Optimization. Oct. 31, 2017.
DB 2 Management of the Power of Battle.
User Documentation 1/3 Hitachi Software Manual MC418F4013.
European Search Report for Application No. 18880194.8 dated Sep. 10, 2020.
Singapore Search Report for Application No. 11202004818S dated Jan. 5, 2021.

* cited by examiner

COST-BASED OPTIMIZER, AND COST ESTIMATION METHOD AND DEVICE THEREOF

This application claims priority to Chinese patent application No. 201711175349.9 filed with CNIPA on Nov. 22, 2017, disclosure of which is incorporated herein by reference in its entirety.

TECHNICAL FIELD

The present application relates to the field of computers, for example, to a cost based optimizer, and a cost estimation method and device.

BACKGROUND

A cost based optimizer (CBO) is a core component of a database system. Because of its significant impact on performance of the database system, the CBO plays an important role in a modern database system. A core of the cost based optimizer is a cost estimation model used for performing cost estimation on an execution plan generated by the database system, so as to select an optimal execution plan. A quality of the estimation model affects a quality of a final execution plan. The cost based optimizer optimizes the execution plan based on statistical information of target data. The completeness and the accuracy of the statistical information directly affect the estimation of the execution plan through the estimation model.

The statistical information is required for cost optimization, so collecting complete and accurate statistical information is an indispensable step for all cost based optimizers. The cost based optimizer is optimized to generate the optimal execution plan. In the database system, the execution plan is generally represented by an operation tree. The operation tree is composed of different types of operations. Operation types included in one operation tree may be a table scan, a selection, a filtering, an aggregate, a join, a projection, and so on. Based on the statistical information, the cost based optimizer may estimate a cost of each operation in the execution plan by use of the cost estimation model and select an execution plan with a minimum overall cost from all possible execution plans as the final execution plan, thereby completing a whole cost optimization process. It can be seen that the core of the cost based optimizer lies in the cost estimation based on the statistical information which is the basis of the cost based optimizer.

The cost based optimizer requires the statistical information and cannot achieve the cost optimization without the necessary statistical information. For example, in a scenario where a temporary table is created when it is running or a subquery exists, the statistical information cannot be determined at a compilation stage, so the cost optimization cannot be achieved. On the other hand, when the cost based optimizer is applied to a big data system to process massive data, statistical information of the massive data is collected at a high cost. Collecting the statistical information of the massive data will become a barrier to an application of the cost based optimizer. For a given data set, statistical information of full data is not necessarily collected, and an optimal plan might be obtained based on partial statistical information. In a case where the statistical information is incomplete or unavailable, the cost based optimizer in the related art cannot work.

SUMMARY

The present application provides a cost based optimizer, and a cost estimation method and device, which can solve the problem of a failure to perform cost estimation in response to incomplete statistical information.

According to an aspect of the present application, provided is a cost estimation method. The method includes: deciding whether acquired statistical information is complete, and if the statistical information is incomplete, determining a cost estimation manner of a first operation type; determining a first cost estimate of the first operation type based on the cost estimation manner, where the first operation type is an operation type of an operation tree relying on the statistical information; and determining an accumulative cost estimate of the operation tree according to the first cost estimate and a second cost estimate of a second operation type, where the second operation type is an operation type of the operation tree not relying on the statistical information.

According to another aspect of the present application, further provided is a cost estimation device. The device includes a deciding means, a determining means and an estimation means.

The deciding means is configured to decide whether acquired statistical information is complete, and if the statistical information is incomplete, determine a corresponding cost estimation manner according to an operation type of an operation tree relying on the statistical information.

The determining means is configured to determine a cost estimate of the corresponding operation type based on the cost estimation manner.

The estimation means is configured to determine an accumulative cost estimate of the operation tree according to the cost estimate corresponding to the operation type relying on the statistical information and a cost estimate corresponding to an operation type not relying on the statistical information.

According to another aspect of the present application, further provided is a cost based optimizer. The cost based optimizer is configured to: generate an original execution plan; decide whether acquired statistical information is complete, if the statistical information is complete, estimate a cost according to a first cost estimation model based on the statistical information, and if the statistical information is incomplete, estimate a cost according to a second cost estimation model; and generate an optimal execution plan according to the cost estimated according to the first cost estimation model or the cost estimated according to the second cost estimation model.

According to another aspect of the present application, further provided is a computing based device, including a processor and a memory configured to store computer-executable instructions. The executable instructions, when executed, cause the processor to: decide whether acquired statistical information is complete, and if the statistical information is incomplete, determine a corresponding cost estimation manner according to an operation type of an operation tree relying on the statistical information; determine a cost estimate of the corresponding operation type based on the cost estimation manner; and determine an accumulative cost estimate of the operation tree according to the cost estimate corresponding to the operation type relying on the statistical information and a cost estimate corresponding to an operation type not relying on the statistical information.

According to another aspect of the present application, further provided is a computer-readable storage medium, which is configured to store computer-executable instructions for executing the cost estimation method described above.

In the present application, in response to deciding that the acquired statistical information is incomplete, the corresponding cost estimation manner is determined according to the operation type of the operation tree relying on the statistical information; the cost estimate of the corresponding operation type is determined based on the cost estimation manner; and the accumulative cost estimate of the operation tree is determined according to the cost estimate corresponding to the operation type relying on the statistical information and the cost estimate corresponding to the operation type not relying on the statistical information, thereby solving the problem that a traditional cost based optimizer fails to perform cost estimation when a temporary table and a subquery are created in a running process, or is limited by a data scale in a scenario of massive data. In addition, an execution plan corresponding to a structured query language (SQL) statement is optimized according to the accumulative cost estimate, and the present application may be applied to optimize an SQL in a database system, thereby improving a cost estimation accuracy of an SQL cost based optimizer and generating an execution plan with better performance.

BRIEF DESCRIPTION OF DRAWINGS

Same or similar reference numerals in the drawings denote same or similar components.

DETAILED DESCRIPTION

In an embodiment of the present application, a terminal, a service network device and a trusted party each include one or more processors (such as central processing units (CPUs)), input/output interfaces, network interfaces and memories.

The memories may include computer-readable storage media like a volatile memory, a random-access memory (RAM) and/or a non-volatile memory such as a read-only memory (ROM) or a flash RAM. A memory is an example of a computer-readable storage medium.

The computer-readable storage media include non-volatile, volatile, removable and non-removable media. Information can be stored using any method or technology. The information may be a computer-readable instruction, a data structure, a program module or other data. Examples of computer storage media include, but are not limited to, a phase RAM (PRAM), a static RAM (SRAM), a dynamic RAM (DRAM), other types of RAM, a ROM, an electrically-erasable programmable ROM (EEPROM), a flash memory or other memory technologies, a compact disc ROM (CD-ROM), a digital versatile disc (DVD) or other optical storages, a magnetic cassette, a magnetic tape, a magnetic disk or other magnetic storage devices, or any other non-transmission medium capable of storing information accessible by a computing device. As defined herein, the computer-readable storage media do not include non-transitory computer-readable media such as modulated data signals and carriers.

Figure 1:
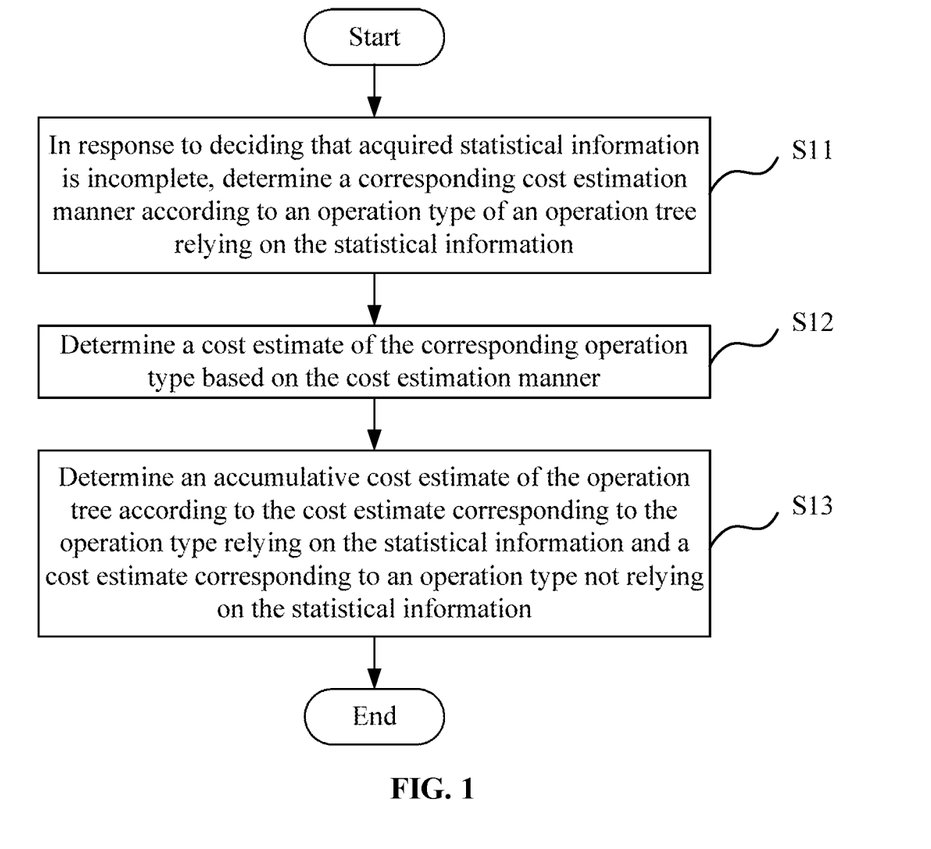
FIG. 1 is a flowchart of a cost estimation method according to an aspect of the present application.

FIG. 1 is a flowchart of a cost estimation method according to an aspect of the present application. The method includes S11 to S13.

In S11, it is decided whether acquired statistical information is complete, and if the acquired statistical information is incomplete, a corresponding cost estimation manner is determined according to an operation type of an operation tree relying on the statistical information.

The operation tree may include multiple operation types, including the operation type relying on the statistical information and an operation type not relying on the statistical information. In the present application, the operation type of the operation tree relying on the statistical information is referred to as a first operation type, a cost estimate of which is referred to as a first cost estimate; the operation type of the operation tree not relying on the statistical information is referred to as a second operation type, a cost estimate of which is referred to as a second cost estimate.

In S12, the first cost estimate of the first operation type is determined based on the cost estimation manner.

In S13, an accumulative cost estimate of the operation tree is determined according to a cost estimate corresponding to the operation type relying on the statistical information (i.e., the first cost estimate of the first operation type) and a cost estimate corresponding to the operation type not relying on the statistical information (i.e., the second cost estimate of the second operation type).

The method can solve the problem of a failure to perform cost estimation when a temporary table and a subquery are created in a running process or the problem of a failure of a tradition cost based optimizer to perform cost optimization due to a limitation of a data scale in a scenario of massive data.

In an optional example, the method in the present application includes optimizing an execution plan corresponding to an SQL statement according to the accumulative cost estimate. The cost estimation method in the present application is applied to optimize an SQL in a database system, thereby improving a cost estimation accuracy of an SQL cost based optimizer and generating an execution plan with better performance.

In an embodiment of the present application, cost optimization may be performed on the execution plan based on incomplete statistical information. In response to complete statistical information, a cost estimation model in the related art is used for estimation, and an optimal execution plan is generated based on an estimation result. In response to incomplete statistical information, the cost estimation method in the present application is used for estimating a cost of a corresponding operation to obtain an estimation result and generating the optimal execution plan based on the estimation result.

Figure 2:
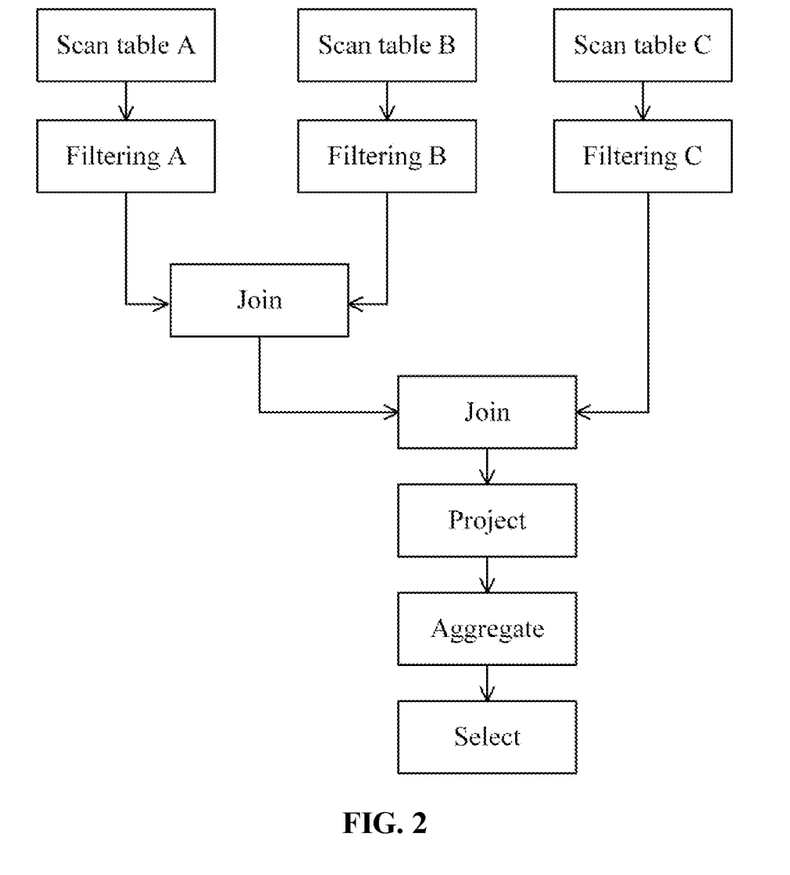
FIG. 2 is a schematic diagram of an operation tree according to an embodiment of the present application.

In S11, it is decided whether the acquired statistical information is complete, and if the statistical information is incomplete, the corresponding cost estimation manner is determined according to the operation type of the operation tree relying on the statistical information (i.e., the first operation type). The operation type of the operation tree relying on the statistical information may include a table scan operation, a filtering operation, a join operation and an aggregate operation. Here, the operation tree is composed of different operators, and each operator represents one operation type, where the operation type may include a table scan, a filtering, a join, a projection, an aggregate, a selection and the like. As shown in FIG. 2 which is a schematic diagram of the operation tree, operation types on the operation tree are adjusted, a cost of each operation type is estimated, and finally an operation tree with a minimum accumulative cost is generated to generate the execution plan. Costs of different operation types rely on the statistical information differently. For example, costs of the table scan operation, the filtering operation, the join operation and the aggregate operation need to rely on the statistical information, that is, only when complete statistical information corresponding to the table scan operation, the filtering operation, the join operation and the aggregate operation is obtained, may cost estimates of the table scan operation, the filtering operation, the join operation and the aggregate operation be determined; while costs of a projection operation and a selection operation do not rely on the statistical information, that is, cost estimates of the projection operation and the selection operation may be determined without acquiring complete statistical information corresponding to the projection operation and the selection operation. Therefore, it is necessary to determine the operation types of the operation tree and determine a cost estimate of each operation type by using a cost estimation manner corresponding to the each operation type. In the present application, it is decided whether the acquired statistical information is complete, and if the statistical information is incomplete, a cost estimation method for the operation type relying on the statistical information is improved.

In S12, the cost estimation manner of the operation type relying on the statistical information is determined, so that the cost estimate of the operation type relying on the statistical information is determined according to the cost estimation manner.

In S13, the accumulative cost estimate of the operation tree is determined according to the cost estimate of the operation type relying on the statistical information (i.e., the first cost estimate of the first operation type) and the cost estimate corresponding to the operation type not relying on the statistical information (i.e., the second cost estimate of the second operation type).

For example, the cost estimates of the table scan operation, the filtering operation, the join operation and the aggregate operation relying on the statistical information and the cost estimates of the projection operation and the selection operation not relying on the statistical information are accumulated to obtain a cost estimate of the operation tree, thereby generating the optimal execution plan.

In an embodiment of the present application, in S12, a cost estimate of the table scan operation is determined according to a record count of a data set; a selection rate of a filtering condition is determined according to a type of a filtering predicate, and a cost estimate of the filtering operation is determined according to the selection rate; a cost estimate of the join operation is determined according to a determined record number of a join result set; and an aggregate rate of aggregated fields is determined according to the aggregated fields and an aggregate function, and a cost estimate of the aggregate operation is determined according to the aggregate rate.

A cost of the table scan operation is related to a size of the data set (also referred to as the record count of the data set). The larger the data set, the higher a table scan cost.

Therefore, the cost estimate of the table scan operation may be determined according to the record count of the data set.

A cost of the filtering operation is related to the selection rate of the filtering condition. The selection rate is calculated according to the filtering condition. A different type of filtering predicate corresponds to a different manner for determining the selection rate of the filtering condition.

A cost of the join operation is related to sizes of data sets participating in a join and a size of the join result set after the join. Therefore, the record count of the join result set is determined, and then the cost estimate of the join operation is determined according to the record count of the join result set.

A cost of the aggregate operation is related to a volume of data participating in an aggregate and the aggregate rate of the aggregated fields. The aggregate rate of the aggregated fields needs to be calculated according to a number of distinct values in the aggregated fields. Therefore, the number of distinct values in the aggregated fields needs to be calculated for determining the cost of the aggregate operation.

In an embodiment of the present application, the record count of the data set is denoted as RC (Row Count), and the size of the data set (denoted as A) is directly proportional to RC, namely, A∝RC. Therefore, in the embodiment of the present application, the size of the data set may be represented by RC, and the cost of the table scan operation is estimated to be:

cost=Op·getOriginalCost(RC);

The formula indicates that the cost estimate of the table scan operation may be determined according to the record count RC of the data set, where Op denotes a target operation whose cost is to be estimated, and getOriginalCost denotes the use of a method in the related art and RC for estimating the cost.

In an embodiment of the present application, in the filtering operation, the cost estimate of the filtering operation is related to the selection rate of the filtering predicate, and different types of filtering predicate correspond to different selection rate estimation algorithms. The selection rate of the filtering condition may be determined by deciding whether an object for calculating the selection rate corresponding to the type of the filtering predicate is available. If the object for calculating the selection rate corresponding to the type of the filtering predicate is unavailable, the selection rate of the filtering condition is S=1/a specified value. Here, the object for calculating the selection rate corresponding to the type of the filtering predicate includes a number of distinct values, an extreme value in a predicate field, and a number of null values in the predicate field. The specified value is determined according to specific practical applications and is a positive number greater than 1. For different types of filtering predicate, the specified value may be same or different, for example, S=1/5, S=1/9, etc.

In an optional example, the cost of the filtering operation is related to the selection rate of the filtering condition. The selection rate of the filtering condition is calculated according to the filtering condition. In the embodiment of the present application, the selection rate of the filtering condition is defined as S=a total number of records in a result set/a total number of records participating in the filtering operation. In response to the object for calculating the selection rate corresponding to the type of the filtering predicate being unavailable, how to determine the selection rate of the filtering condition according to the type of the filtering predicate is discussed below.

In response to the type of the filtering predicate being an identity predicate, it is decided whether a number of distinct values of the filtering operation is available, and if the number of distinct values of the filtering operation is unavailable, the selection rate of the filtering condition is S=1/the specified value. Here, in response to the identity predicate (Equal or =), if the number of distinct values (NDV) is available, the selection rate of the filtering condition is S=1/NDV, and if the number of distinct values is unavailable, $S_{(identity\ predicate)}=1/10$, where $S_{(identity\ predicate)}=1/10$ is determined according to an empirical value, and may also be other specified values.

In response to the type of the filtering predicate being a non-identity predicate (Non-Equal or !=), the selection rate of the non-identity predicate is $S_{(non-identity\ predicate)}=1-S_{(identity\ predicate)}$. The identity predicate and the non-identity predicate are a pair of complementary predicates, that is, a sum of the selection rate of the filtering condition of the identity predicate and that of the non-identity predicate is 1.

In response to the type of the filtering predicate being a range predicate, where the range predicate includes a one-sided interval range (>, <, a two-sided interval range (BETWEEN), and in or not in a set (IN), if an extreme value or a number of distinct values in a range predicate field is unavailable, the selection rate of the filtering condition is S=1/the specified value. In response to the range predicate being, for example, >, <, the selection rate of the filtering condition is determined according to the extreme value in the range predicate field. In response to the extreme value being unavailable, the selection rate of the filtering condition is defined as S=1/3. In response to the range predicate being, for example, BETWEEN, i.e., the filtering condition is between two values, in response to the extreme value being unavailable, the selection rate of the filtering condition is defined as S=1/9. In response to the range predicate being, for example, IN, $C=\{v_1, v_2, \ldots, v_n\}$, that is, the filtering condition col IN is:

col IN$(v_1,v_2,\ldots,v_n),n=|C|,$ where $v_1, v_2, v_n$ are filtering values, C is a set of filtering values, and n is a number of filtering values in a set C. During a filtering process, it is decided whether data to be filtered is a value in the set C. In response to the number of distinct values being unavailable, the selection rate of the filtering condition is defined as S=1/5.

In response to the type of the filtering predicate being a NULL predicate, it is decided whether a number of null values in a NULL predicate field is available, and if the number of null values in the NULL predicate field is unavailable, the selection rate of the filtering condition is determined as S=1/the specified value. In response to the type of the filtering predicate being the NULL predicate, the selection rate needs to be estimated according to the number of null values in the NULL predicate field. In response to the number of null values being unavailable, the selection rate of the filtering condition is defined as S=1/10.

In response to the type of the filtering predicate being a non-NULL predicate, the selection rate of the filtering condition is $S_{non-NULL\ predicate}=1-S_{NULL}$ predicate since the non-NULL predicate and the NULL predicate are complementary predicates.

The type of the filtering predicate further includes the following cases: in response to the type of the filtering predicate being LIKE, the selection rate of the filtering condition is S=1/the specified value. In response to the type of the filtering predicate being LIKE, the selection rate is defined as S=1/5. In response to the type of the filtering predicate being an AND-cascaded predicate, the selection rate of the filtering condition is determined according to a product of selection rates of cascaded predicates and a minimum value of filtering rates of the AND-cascaded predicate.

An AND-cascaded filtering predicate is denoted as an And-cascaded filtering predicate. To prevent an estimation error from being amplified by cascading, in the embodiment of the present application, the selection rate of the filtering condition is estimated in the following manner:

$$\text{selectivity}(P) = \max\left(\prod_{k=1}^{n}\text{selectivity}(P_k), \alpha\right), \alpha > 0,$$

where a defines the minimum value of the filtering rates of the AND-cascaded filtering predicate, and a value of a may be adjusted according to practical situations; and selectivity is the selection rate. The above formula indicates that a larger value between a cascading selection rate value of the AND-cascaded filtering predicate and the minimum value of the filtering rates of the AND-cascaded filtering predicate is used as the selection rate of the filtering condition.

In response to the type of the filtering predicate being an OR-cascaded predicate, the selection rate of the filtering condition is determined according to selection rates of cascaded predicates corresponding to the OR-cascaded predicate. Here, an OR-cascaded filtering predicate is denoted as:

$P=P_1$ OR $P_2$ OR $\ldots P_n$.

The selection rate of the filtering condition is determined in the following manner:

$$\text{selectivity}(P) = 1 - \prod_{k=1}^{n}[1-\text{selectivity}(P_k)].$$

The selection rate of the filtering condition is discussed for different types of filtering predicate, and the cost of the filtering operation may be calculated according to the determined selection rate:

cost=Op·getOriginalCost(selectivity).

It is to be noted that those skilled in the art should understand that values of S=1/the specified value listed in the above-mentioned embodiments are only examples, and in the above-mentioned embodiments, the selection rate of the filtering condition corresponding to each type of filtering predicate may be adjusted according to practical situations or may be dynamically changed in a manner such as a parameter transfer.

In an embodiment of the present application, before the cost estimate of the join operation is determined according to the determined record count of the join result set, the record count of the join result set is determined according to a number of distinct values in joined fields of a left table and a number of distinct values in joined fields of a right table joined to the left table. Here, the left table participating in a join is denoted as $T_{left}$, the record count of the left table is $RC_{left}$, and the number of distinct values is $NDV_{left}$; the right table participating in the join is denoted as $T_{right}$, the record count of the right table is $RC_{right}$, and the number of distinct values is $NDV_{right}$; and the record count of the result set is denoted as $RC_{result}$. The left table and the right table participating in the join each include the selection operation, the filtering operation, the table scan operation, etc., and the left table and the right table respectively constitute a left operation tree and a right operation tree, where a cost estimate of each operation type on the operation tree may be estimated. Therefore, sizes of data sets (i.e., $RC_{left}$ and $RC_{right}$) of the left table and the right table participating in the join may be calculated by estimating operation types included in the left table and the right table and an existing calculation method.

In an embodiment of the present application, in response to the number of distinct values in the joined fields of the left table and the number of distinct values in the joined fields of the right table joined to the left table being unavailable, the record count of the join result set is determined based on a join type of the joined fields. How to determine the record count of the join result set based on the join type of the joined fields is discussed hereinafter.

In response to the join type of the joined fields in the left and right tables being a join in a primary key (PK)-foreign key (FK) form, the record count of the join result set is determined according to a record count of a foreign key field and a selection rate of a filtering condition of a primary key field. That the join type of the joined fields in the left and right tables is the join in the PK-FK form may refer to that a join type of the joined fields in the left table is a join in a PK form, and a join type of the joined fields in the right table is a join in an FK form or that the join type of the joined fields in the left table is the join in the FK form, and the join type of the joined fields in the right table is the join in the PK form.

If the join type of the joined fields in the left table is the join in the PK form, and the join type of the joined fields in the right table is the join in the FK form, the record count $RC_{result}$ of the join result set is:

$$RC_{result} = RC_{fk} \times \text{selectivity(PK)},$$

where $RC_{fk}$ is one of $RC_{left}$ or $RC_{right}$ and denotes the record count of the foreign key field, and selectivity(PK) denotes the selection rate of the filtering condition of the primary key field. If the primary key field includes the filtering condition, a final join result will also be affected by the filtering condition. Therefore, when the record count of the join result set is calculated, the record count of the foreign key field is multiplied by the selection rate of the filtering condition of the primary key field. In response to the primary key field including no filtering condition, the selection rate of the filtering condition of the primary key field is selectivity (PK)=1.

In response to the join type of the joined fields in the left and right tables being a non-PK-FK join, cases 1 to 4 are included.

Case 1: In response to the join type of the joined fields in the left and right tables being an inner join, a larger value between the record count of the left table and the record count of the right table joined to the left table is used as the record count of the join result set. Here, in an embodiment of the present application, the record count of the join result set is estimated as the larger value between the record count of the joined left table and the record count of the joined right table, namely, $RC_{result} = \max(RC_{left}, RC_{right})$. That is, a record count of the join result is the larger value between $RC_{left}$ and $RC_{right}$.

Case 2: In response to the join type of the joined fields in the left and right tables being a cross join, a product of the record count of the left table and the record count of the right table joined to the left table is used as the record count of the join result set. For the cross join, the record count of the join result set is the product of the record counts, namely, Case 3: In response to the join type of the joined fields in the left table being a left outer join, or the join type of the joined fields in the right table being a right outer join, the record count of the left table or the record count of the right table joined to the left table is correspondingly used as the record count of the join result set. In response to the join type of the joined fields being the left outer join, the record count of the join result set is the record count $RC_{left}$ in $T_{left}$, namely, $RC_{result} = RC_{left}$. In response to the join type of the joined fields being the right outer join, the record count in the join result set is the record count $RC_{right}$ in $T_{right}$, namely, $RC_{result} = RC_{right}$.

Case 4: In response to the join type of the joined fields in the left and right tables being a full join, a sum of the record count of the left table and the record count of the right table joined to the left table is used as the record count of the join result set. Here, in response to the join type of the joined fields being a full outer join, the record count of the join result set is the sum of the record count in $T_{left}$ and the record count in $T_{right}$, namely, $RC_{result} = RC_{left} + RC_{right}$.

Finally, the cost estimate of the join operation is cost=Op·getOriginalCost($RC_{left}$, $RC_{right}$, $RC_{result}$).

In an embodiment of the present application, for a process of the aggregate operation, the cost estimate of the aggregate operation is related to a volume of data participating in an aggregate and the aggregate rate of the aggregated fields. The aggregate rate $R_{agg}$ may be defined as:

$$R_{agg} = \frac{\text{Number of records in an aggregate result}}{\text{Number of records participating in the aggregate}}$$

The aggregate rate of the aggregated fields needs to be calculated according to the number of distinct values in the aggregated fields. In response to the number of distinct values in the aggregated fields being unavailable, the following discussion is performed.

A set C of aggregated fields is denoted as C={$c_1$, $c_2$, ..., $c_n$}, n=|C|, where $c_1$, $c_2$ and $c_n$ are aggregated fields, and n is a number of aggregated fields in the set of aggregated fields.

In response to the set C of aggregated fields including at least one primary key, the aggregate rate $R_{agg}$ of the aggregated fields is 1, i.e., $R_{agg}$=1.

In response to the aggregate function corresponding to the aggregated fields being Group By, the aggregate rate $R_{agg}$ of the aggregated fields is the following piecewise function:

$$R_{agg} = \begin{cases} 1, & n > 6 \\ 1 - \frac{1}{2^n}, & n \leq 6 \end{cases},$$

where n is the number of aggregated fields in the set of aggregated fields.

In response to the aggregate function corresponding to the aggregated fields being ROLLUP, the aggregate rate $R_{agg}$ of the aggregated fields is:

$$R_{agg} = \sum_{k=1}^{n} \left(1 - \frac{1}{2^k}\right) = n - 1 + \frac{1}{2^n},$$

where n is the number of aggregated fields in the set of aggregated fields, and k is a positive integer.

In response to the aggregate function corresponding to the aggregated fields being CUBE, the aggregate rate $R_{agg}$ of the aggregated fields is:

$$R_{agg} = \sum_{k=1}^{n} C_n^k \times \left(1 - \frac{1}{2^k}\right) = 2^n - \sum_{k=0}^{n} C_n^k \times \frac{1}{2^k},$$

where n is the number of aggregated fields in the set of aggregated fields, and k is a positive integer.

To conclude, in a case where the statistical information is inaccurate or incomplete, the cost estimation method according to the above-mentioned embodiments of the present application may be used for performing cost estimation on the operation tree. The cost estimation method of the present application may be applied to a temporary table and a subquery created in a running process and a scenario of massive data. The cost estimation may be quickly performed without being limited by a data scale. On the other hand, a cost based optimizer in the related art is improved based on the cost estimation method of the present application, and the cost optimization may be performed on the execution plan based on the incomplete statistical information. In response to the complete statistical information, the cost estimation model in the related art may be used for estimating a cost of a corresponding operation, and the optimal execution plan is generated based on the estimation result. In response to the incomplete statistical information, the cost based optimizer in the related art cannot estimate the cost of the corresponding operation, and a cost estimation model (improving a cost estimation method of related operations of the operation tree) of the present application may be used for estimating the cost of the corresponding operation and generating the optimal execution plan based on the estimation result.

Figure 3:
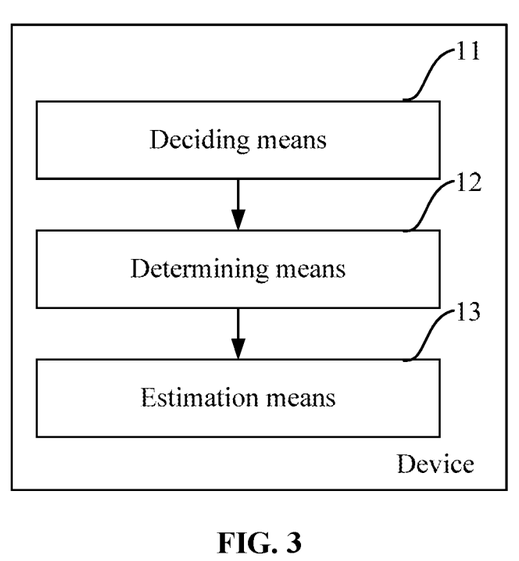
FIG. 3 is a structural diagram of a cost estimation device according to another aspect of the present application.

FIG. 3 is a structural diagram of a cost estimation device according to another aspect of the present application. The device includes a deciding means 11, a determining means 12 and an estimation means 13.

The deciding means 11 is configured to decide whether acquired statistical information is complete, and if the statistical information is incomplete, determine a corresponding cost estimation manner according to an operation type of an operation tree relying on the statistical information.

The determining means 12 is configured to determine a cost estimate of the corresponding operation type based on the cost estimation manner.

The estimation means 13 is configured to determine an accumulative cost estimate of the operation tree according to the cost estimate corresponding to the operation type relying on the statistical information and a cost estimate corresponding to an operation type not relying on the statistical information.

The above means can solve the problem that a cost based optimizer in the related art fails to perform cost estimation when a temporary table and a subquery are created in a running process, or is limited by a data scale in a scenario of massive data.

In an optional example, the device further includes an execution means. The execution means is configured to optimize an execution plan corresponding to an SQL statement according to the accumulative cost estimate. The cost estimation method in the present application is applied to optimize an SQL in a database system, thereby improving a cost estimation accuracy of an SQL cost based optimizer and generating an execution plan with better performance.

In an embodiment of the present application, a cost based optimizer in the present application may perform cost optimization on the execution plan based on incomplete statistical information. In response to complete statistical information, a cost estimation model in the related art is used for estimation, and an optimal execution plan is generated based on an estimation result. In response to incomplete statistical information, the cost estimation method in the present application is used for estimating a cost of a corresponding operation and generating the optimal execution plan based on an estimation result.

The deciding means 11 is configured to: in response to deciding that the acquired statistical information is incomplete, determine the corresponding cost estimation manner according to the operation type of the operation tree relying on the statistical information. The operation type of the operation tree relying on the statistical information includes a table scan operation, a filtering operation, a join operation and an aggregate operation. Here, the operation tree is composed of different operators, and each operator represents one operation type, where operation types on the operation tree may include a table scan, a filtering, a join, a projection, an aggregate, a selection and the like. As shown in FIG. 2 which is a schematic diagram of the operation tree, the operation types on the operation tree are adjusted, a cost of each operation type is estimated, and finally an operation tree with a minimum accumulative cost is generated to generate the execution plan. However, costs of different operation types rely on the statistical information differently. For example, cost estimates of the table scan operation, the filtering operation, the join operation and the aggregate operation need to rely on the statistical information, while cost estimates of a projection operation and a selection operation do not rely on the statistical information. Therefore, it is necessary to determine the operation types and estimate a cost of each operation type by using a corresponding cost estimation manner. In response to deciding that the acquired statistical information is incomplete, a cost estimation method for the operation type relying on the statistical information is improved.

The determining means 12 is configured to determine the cost estimation manner for the operation type relying on the statistical information and determine the cost estimate of the operation type.

The estimation means 13 is configured to determine the accumulative cost estimate of the operation tree according to the cost estimate corresponding to the operation type relying on the statistical information and the cost estimate corresponding to the operation type not relying on the statistical information. For example, the cost estimates of the table scan operation, the filtering operation, the join operation and the aggregate operation relying on the statistical information and the cost estimates of the projection operation and the selection operation not relying on the statistical information are accumulated to obtain a cost estimate of the operation tree, thereby generating the optimal execution plan.

In an embodiment of the present application, the determining means 12 is configured to determine a cost estimate of the table scan operation according to a record count of a data set; determine a selection rate of a filtering condition according to a type of a filtering predicate, and determine a cost estimate of the filtering operation according to the selection rate; determine a cost estimate of the join operation according to a determined record count of a join result set; and determine an aggregate rate of aggregated fields according to the aggregated fields and an aggregate function, and determine a cost estimate of the aggregate operation according to the aggregate rate.

Here, a cost of the table scan operation is related to a size of the data set (also referred to as the record count of the data set). The larger the data set, the higher a table scan cost. Therefore, the cost estimate of the table scan operation may be determined according to the record count of the data set.

A cost of the filtering operation is related to the selection rate of the filtering condition. The selection rate is calculated according to the filtering condition. A different type of filtering predicate corresponds to a different manner for determining the selection rate.

A cost of the join operation is related to sizes of data sets participating in a join and a size of the join result set after the join. Therefore, the record count of the join result set is determined, and then the cost estimate of the join operation is determined according to the record count of the join result set.

A cost of the aggregate operation is related to a volume of data participating in an aggregate and the aggregate rate of the aggregated fields. The aggregate rate of the aggregated fields needs to be calculated according to a number of distinct values in the aggregated fields. Therefore, the number of distinct values in the aggregated fields needs to be calculated.

In an embodiment of the present application, the record count of the data set is denoted as RC (Row Count), and the size of the data set (denoted as A) is directly proportional to RC, namely, A∝RC. Therefore, in the embodiment of the present application, the size of the data set may be represented by RC, and the cost of the table scan operation is estimated to be:

cost=Op·getOriginalCost(RC);

The formula indicates that the cost estimate of the table scan operation may be determined according to the record count RC of the data set, where Op denotes a target operation whose cost is to be estimated, and getOriginalCost denotes the use of a method in the related art and RC for estimating the cost.

In an embodiment of the present application, in the filtering operation, the cost estimate of the filtering operation is related to the selection rate of the filtering predicate, and different types of filtering predicate correspond to different selection rate estimation algorithms. The selection rate of the filtering condition may be determined by deciding whether an object for calculating the selection rate corresponding to the type of the filtering predicate is available. If the object for calculating the selection rate corresponding to the type of the filtering predicate is unavailable, the selection rate of the filtering condition is S=1/a specified value. Here, the object for calculating the selection rate corresponding to the type of the filtering predicate includes a number of distinct values, an extreme value in a predicate field, and a number of null values in the predicate field. The specified value is determined according to specific practical applications and is a positive number greater than 1. For different types of filtering predicate, the specified value may be same or different, for example, S=1/5, S=1/9, etc.

In an optional example, the cost of the filtering operation is related to the selection rate of the filtering condition. The selection rate of the filtering condition is calculated according to the filtering condition. In the embodiment of the present application, the selection rate of the filtering condition is defined as S=a total number of records in a result set/a total number of records participating in the filtering operation. In response to the object for calculating the selection rate corresponding to the type of the filtering predicate being unavailable, how to determine the selection rate of the filtering condition according to the type of the filtering predicate is discussed below.

In response to the type of the filtering predicate being an identity predicate, it is decided whether a number of distinct values of the filtering operation is available, and if the number of distinct values of the filtering operation is unavailable, the selection rate of the filtering condition is S=1/the specified value. Here, in response to the identity predicate (Equal or =), if the number of distinct values (NDV) is available, the selection rate of the filtering condition is S=1/NDV, and if the number of distinct values is unavailable, $S_{(identity\ predicate)}=1/10$, where $S_{(identity\ predicate)}=1/10$ is determined according to an empirical value, and may also be other specified values.

In response to the filtering predicate being a non-identity predicate (Non-Equal or !=), the selection rate of the non-identity predicate is $S_{(non-identity\ predicate)}=1-S_{(identity\ predicate)}$. The identity predicate and the non-identity predicate are a pair of complementary predicates, that is, a sum of the selection rate of the filtering condition of the identity predicate and that of the non-identity predicate should be 1.

In response to the type of the filtering predicate being a range predicate, where the range predicate includes a one-sided interval range (>, <, a two-sided interval range (BETWEEN), and in or not in a set (IN), if an extreme value or a number of distinct values in a range predicate field is unavailable, the selection rate of the filtering condition is S=1/the specified value. In response to the range predicate is, for example, >, <, the selection rate of the filtering condition is determined according to the extreme value in the range predicate field. In response to the extreme value being unavailable, the selection rate of the filtering condition is defined as S=1/3. In response to the range predicate is, for example, BETWEEN, i.e., the filtering condition is between two values, in response to the extreme value being unavailable, the selection rate of the filtering condition is defined as S=1/9. In response to the range predicate is, for example. IN, $C=\{v_1, v_2, \ldots, v_n\}$, that is, the filtering condition col IN is:

col IN($v_1, v_2, \ldots, v_n$),n=|C|, where $v_1, v_2, \ldots, v_n$ are filtering values, C is a set of filtering values, and n is a number of filtering values in a set C. During a filtering process, it is decided whether data to be filtered is a value in the set C. In response to the number of distinct values being unavailable, the selection rate of the filtering condition is defined as S=1/5.

In response to the type of the filtering predicate being a NULL predicate, it is decided whether a number of null values in a NULL predicate field is available, and if the number of null values in the NULL predicate field is unavailable, the selection rate of the filtering condition is determined as S=1/the specified value. In response to the type of the filtering predicate being the NULL predicate, the selection rate needs to be estimated according to the number of null values in the NULL predicate field. In response to the number of null values being unavailable, the selection rate of the filtering condition is defined as S=1/10. In response to the type of the filtering predicate being a non-NULL predicate, since the non-NULL predicate and the NULL predicate are complementary predicates, the selection rate of the filtering condition is $S_{non-NULL\ predicate}=1-S_{NULL}$ predicate.

The type of the filtering predicate further includes the following cases: in response to the type of the filtering predicate being LIKE, the selection rate of the filtering condition is S=1/the specified value. In response to the type of the filtering predicate being LIKE, the selection rate is defined as S=1/5. In response to the type of the filtering predicate being an AND-cascaded predicate, the selection rate of the filtering condition is determined according to a product of selection rates of cascaded predicates and a minimum value of filtering rates of the AND-cascaded predicate.

An AND-cascaded filtering predicate is donated as an And-cascaded filtering predicate which is $P=P_1$ AND $P_2$ AND . . . $P_n$. To prevent an estimation error from being amplified by cascading, in the embodiment of the present application, the selection rate of the filtering condition is estimated in the following manner:

$$\text{selectivity}(P) = \max\left(\prod_{k=1}^{n} \text{selectivity}(P_i), \alpha\right), \alpha > 0,$$

where $\alpha$ defines the minimum value of the filtering rates of the AND-cascaded filtering predicate, and a value of $\alpha$ may be adjusted according to practical situations; and selectivity is the selection rate. The above formula indicates that a larger value between a cascading selection rate value of the AND-cascaded filtering predicate and the minimum value of the filtering rate of the AND-cascaded filtering predicate is used as the selection rate of the filtering condition.

In response to the type of the filtering predicate being an OR-cascaded predicate, the selection rate of the filtering condition is determined according to selection rates of cascaded predicates corresponding to the OR-cascaded predicate. Here, an OR-cascaded filtering predicate is denoted as:

$P=P_1$ OR $P_2$ OR . . . $P_n$.

The selection rate of the filtering condition is determined in the following manner:

$$\text{selectivity}(P) = 1 - \prod_{k=1}^{n} [1 - \text{selectivity}(P_k)].$$

The selection rate of the filtering condition is discussed for different types of filtering predicate, and the cost of the filtering operation may be calculated according to the determined selection rate:

cost=Op·getOriginalCost(selectivity).

It is to be noted that those skilled in the art should understand that values of S=1/the specified value listed in the above-mentioned embodiments are only examples, and in the above-mentioned embodiments, the selection rate of the filtering condition for each type of filtering predicate may be adjusted according to practical situations or may be dynamically changed in a manner such as a parameter transfer.

In an embodiment of the present application, before the cost estimate of the join operation is determined according to the determined record count of the join result set, the record count of the join result set is determined according to a number of distinct values in joined fields of a left table and a number of distinct values in joined fields of a right table joined to the left table. Here, the left table participating in a join is denoted as $T_{left}$, the record count of the left table is $RC_{left}$, and the number of distinct values is $NDV_{left}$; the right table participating in the join is denoted as $T_{right}$, the record count of the right table is $RC_{right}$, and the number of distinct values is $NDV_{right}$; and the record count of the result set is denoted as $RC_{result}$. The left table and the right table participating in the join each include the selection operation, the filtering operation, the table scan operation, etc., and the left table and the right table respectively constitute a left operation tree and a right operation tree, where a cost estimate of each operation type on the operation tree may be estimated. Therefore, sizes of data sets (i.e., $RC_{left}$ and $RC_{right}$) of the left table and the right table participating in the join may be calculated by estimating operation types in the left table and the right table and an existing calculation method.

In an embodiment of the present application, in response to the number of distinct values in the joined fields of the left table and the number of distinct values in the joined fields of the right table joined to the left table being unavailable, the record count of the join result set is determined based on a join type of the joined fields. How to determine the record count of the join result set based on the join type of the joined fields is discussed hereinafter.

In response to the join type of the joined fields being a join in a primary key-foreign key form, the record count of the join result set is determined according to a record count of a foreign key field and a selection rate of a filtering condition of a primary key field. If a join type of the joined fields in the left table and a join type of the joined fields in the right table are respectively a join in a PK form and a join in an FK form, the record count $RC_{result}$ of the join result set is:

$RC_{result}=RC_{fk}\times\text{selectivity}(PK)$, where $RC_{fk}$ is one of $RC_{left}$ or $RC_{right}$ and denotes the record count of the foreign key field, and selectivity (PK) denotes the selection rate of the filtering condition of the primary key field. If the primary key field includes the filtering condition, a final join result will also be affected by the filtering condition. Therefore, when the record count of the join result set is calculated, the record count of the foreign key field is multiplied by the selection rate of the filtering condition of the primary key field. In response to the primary key field including no filtering condition, the selection rate of the filtering condition of the primary key field is selectivity (PK)=1.

In response to the join type of the joined fields being a non-PK-FK join, cases 1 to 4 are included.

Case 1: In response to the join type of the joined fields being an inner join, a larger value between the record count of the left table and the record count of the right table joined to the left table is used as the record count of the join result set. Here, in an embodiment of the present application, the record count of the join result set is estimated as the larger value between the record count of the joined left table and the record count of the joined right table, namely, $RC_{result}=\max(RC_{left}, RC_{right})$. That is, the record count of the join result is the larger value between $RC_{left}$ and $RC_{right}$.

Case 2: In response to the join type of the joined fields being a cross join, a product of the record count of the left table and the record count of the right table joined to the left table is used as the record count of the join result set. For the cross join, t the record count of the join result set is the product of the record count, namely $RC_{result}=RC_{left}\times RC_{right}$.

Case 3: In response to the join type of the joined fields being a left outer join or a right outer join, the record count of the left table and the record count of the right table joined to the left table is correspondingly used as the record count of the join result set. In response to the join type of the joined fields being the left outer join, the record count of the join result set is the record count $RC_{left}$ in $T_{left}$, namely, $RC_{result}=RC_{left}$. In response to the join type of the joined fields being the right outer join, the record count of the join result set is the record count $RC_{right}$ in $T_{right}$, namely, $RC_{result}=RC_{right}$.

Case 4: In response to the join type of the joined fields being a full join, a sum of the record count of the left table and the record count of the right table joined to the left table is used as the record count of the join result set. Here, in response to the join type of the joined fields being a full outer join, the record count of the join result set is the sum of the record count in $T_{left}$ and the record count in $T_{right}$, namely, $RC_{result}=RC_{left}+RC_{right}$.

Finally, the cost estimate of the join operation is cost=op·getOriginalCost($RC_{left}$, $RC_{righy}$, $RC_{result}$).

In an embodiment of the present application, for a process of the aggregate operation, the cost estimate of the aggregate operation is related to a volume of data participating in an aggregate and the aggregate rate of the aggregated fields. The aggregate rate $R_{agg}$ may be defined as:

$$R_{agg} = \frac{\text{Number of records in an aggregate result}}{\text{Number of records participating in the aggregate}}$$

The aggregate rate of the aggregated fields needs to be calculated according to the number of distinct values in the aggregated fields. In response to the number of distinct values in the aggregated fields being unavailable, the following discussion is performed.

A set C of aggregated fields is denoted as C={$c_1$, $c_2$, ..., $c_n$}, n=|C|, where $c_1$, $c_2$ and $c_n$ are aggregated fields, and n is a number of aggregated fields in the set of aggregated fields.

In response to the set C of aggregated fields including at least one primary key, the aggregate rate $R_{agg}$ of the aggregated fields is 1, i.e., $R_{agg}=1$.

In response to the aggregate function corresponding to the aggregated fields being Group By, the aggregate rate $R_{agg}$ of the aggregated fields is the following piecewise function:

$$R_{agg} = \begin{cases} 1, & n > 6 \\ 1 - \frac{1}{2^n}, & n \leq 6 \end{cases},$$

where n is the number of aggregated fields in the set of aggregated fields.

In response to the aggregate function corresponding to the aggregated fields being ROLLUP, the aggregate rate $R_{agg}$ of the aggregated fields is:

$$R_{agg} = \sum_{k=1}^{n} \left(1 - \frac{1}{2^k}\right) = n - 1 + \frac{1}{2^n},$$

where n is the number of aggregated fields in the set of aggregated fields, and k is a positive integer.

In response to the aggregate function corresponding to the aggregated fields being CUBE, the aggregate rate $R_{agg}$ of the aggregated fields is:

$$R_{agg} = \sum_{k=1}^{n} C_n^k \times \left(1 - \frac{1}{2^k}\right) = 2^n - \sum_{k=0}^{n} C_n^k \times \frac{1}{2^k},$$

where n is the number of aggregated fields in the set of aggregated fields, and k is a positive integer.

According to another aspect of the present application, further provided is a cost based optimizer. The cost based optimizer is configured to: generate an original execution plan; decide whether acquired statistical information is complete, if the statistical information is complete, estimate a cost according to a first cost estimation model (a cost estimation model in the related art) based on the statistical information, and if the statistical information is incomplete, estimate a cost according to a second cost estimation model (a cost estimation model in the present application) improved based on the first cost estimation model; and generate an optimal execution plan according to the cost estimated according to the first cost estimation model or the cost estimated according to the second cost estimation model.

Figure 4:
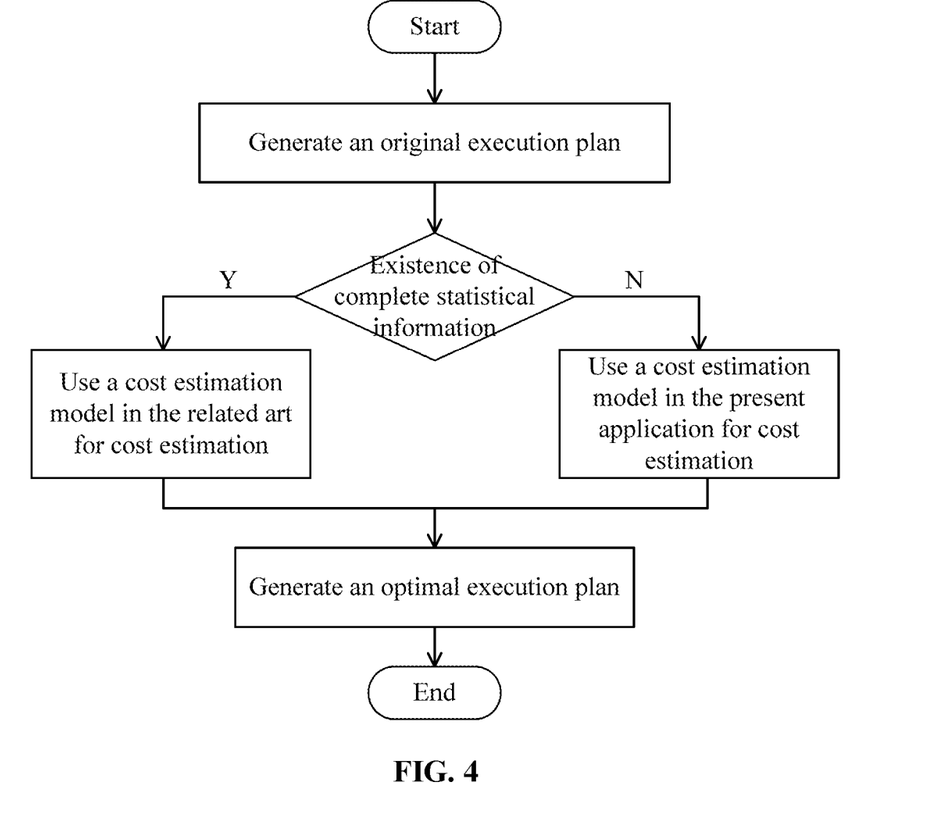
FIG. 4 is a schematic diagram of an improved cost based optimizer according to another aspect of the present application.

In an embodiment of the present application, the cost based optimizer shown in FIG. 4 may perform cost optimization on the execution plan based on incomplete statistical information. In response to existence of complete statistical information, the first cost estimation model is used for estimating the cost, where the first cost estimation model is the cost estimation model in the related art which requires the statistical information for the cost optimization. Therefore, complete and accurate statistical information needs to be collected. In a database system, the execution plan is generally represented by an operation tree. The operation tree is composed of different operation types. Operations may be a table scan, a selection, a filtering, an aggregate, a join, a projection, and so on. In response to the existence of complete statistical information, based on the statistical information, the cost based optimizer may estimate a cost of each operation type in the execution plan by use of the cost estimation model and select an execution plan with a minimum overall cost from all possible execution plans as a final execution plan, thereby completing a whole cost optimization process. In response to non-existence of complete statistical information, the second cost estimation model improved based on the first cost estimation model is used for estimating the cost, that is, the cost estimation model in the present application is used, and the optimal execution plan is generated based on an estimation result. The cost estimation model in the present application is configured to determine a corresponding cost estimation manner according to an operation type of the operation tree relying on the statistical information (i.e., a first operation type); determine a cost estimate of the corresponding operation type (i.e., a first cost estimate of the first operation type) based on the cost estimation manner; and determine an accumulative cost estimate of the operation tree according to the cost estimate corresponding to the operation type relying on the statistical information and a cost estimate corresponding to an operation type not relying on the statistical information (i.e., a cost estimate corresponding to a second operation type).

To conclude, in a case where the statistical information is inaccurate or incomplete, the method performed by the cost estimation device according to the above-mentioned embodiments of the present application may be used for performing cost estimation on the operation tree. The cost estimation device of the present application may be applied to a temporary table and a subquery created in a running process and may quickly perform the cost estimation without being limited by a data scale in a scenario of massive data. On the other hand, the cost based optimizer obtained based on the cost estimation device of the present application may perform the cost optimization on the execution plan based on the incomplete statistical information. In response to the complete statistical information, the cost estimation model in the related art may be used for estimating a cost of a corresponding operation, and the optimal execution plan is generated based on an estimation result. In response to the incomplete statistical information, the cost based optimizer in the related art cannot estimate the cost of the corresponding operation, and the cost estimation model (improving a cost estimation method of related operations of the operation tree) of the present application is used for estimating the cost of the corresponding operation and generating the optimal execution plan based on an estimation result.

In an embodiment of the present application, further provided is a computing based device, including a processor and a memory configured to store computer-executable instructions.

The executable instructions, when executed, cause the processor to: decide whether acquired statistical information is complete, and if the statistical information is incomplete, determine a corresponding cost estimation manner according to an operation type of an operation tree relying on the statistical information (i.e., a first operation type); determine a cost estimate of the corresponding operation type (i.e., a first cost estimate of the first operation type) based on the cost estimation manner; and determine an accumulative cost estimate of the operation tree according to the cost estimate corresponding to the operation type relying on the statistical information (the first cost estimate of the first operation type) and a cost estimate corresponding to an operation type not relying on the statistical information (i.e., a second cost estimate corresponding to a second operation type).

It is to be noted that the present application may be implemented by software and/or a combination of software and hardware, for example, the present application may be implemented using an application-specific integrated circuit (ASIC), a general-purpose computer or any other similar hardware device. In one embodiment, software programs of the present application may be executed by a processor to implement the steps or the functions described above. Likewise, the software programs (including related data structures) of the present application may be stored in a computer-readable recording medium, such as a RAM, a magnetic or optical drive or a floppy disk, and similar devices. In addition, some steps or functions of the present application may be implemented by hardware, such as a circuit in cooperation with the processor to perform various steps or functions.

In addition, part of the present application may be applied as a computer program product, for example, computer program instructions which, when executed by a computer, may invoke or provide the method and/or the technical solutions according to the present application through an operation of the computer. Program instructions for invoking the method of the present application may be stored in a fixed or removable recording medium, and/or transmitted through a data stream in a broadcast or another signal-carrying medium, and/or stored in a working memory of a computer device which runs in accordance with the program instructions. Here, according to an embodiment of the present application, an apparatus is included. The apparatus includes a memory for storing computer program instructions and a processor for executing program instructions, where the computer program instructions, when executed by the processor, trigger the apparatus to perform the method and/or the technical solutions according to multiple embodiments of the present application.

It will be apparent to those skilled in the art that the present application is not limited to details of the above-described exemplary embodiments. Therefore, the embodiments are to be construed as illustrative and not restrictive. Any reference numerals in the claims are not to be construed as limiting the claims. In addition, the word "comprise" or "include" does not exclude other units or steps and the singular does not exclude the plural. Multiple units or means described in device claims may also be implemented by one unit or means through software or hardware. The words such as "first" and "second" are used for indicating names and do not indicate any particular order.

What is claimed is:

1. A cost estimation method, comprising:
deciding whether acquired statistical information is complete, and in response to determining that the statistical information is incomplete, determining a cost estimation manner of a first operation type, wherein the first operation type is an operation type of an operation tree relying on the statistical information;
determining a first cost estimate of the first operation type based on the cost estimation manner;
determining an accumulative cost estimate of the operation tree according to the first cost estimate and a second cost estimate of a second operation type, wherein the second operation type is an operation type of the operation tree not relying on the statistical information; and
optimizing an execution plan corresponding to a structured query language (SQL) statement according to the accumulative cost estimate;
wherein the first operation type comprises a table scan operation, a filtering operation, a join operation and an aggregate operation; and
wherein the second operation type comprises a projection operation and a selection operation.

2. The method of claim 1, wherein determining the first cost estimate of the first operation type based on the cost estimation manner comprises:
determining a cost estimate of the table scan operation according to a record count in a data set;
determining a selection rate of a filtering condition according to a type of a filtering predicate, and determining a cost estimate of the filtering operation according to the selection rate;
determining a cost estimate of the join operation according to a determined record count of a join result set; and
determining an aggregate rate of aggregated fields according to the aggregated fields and an aggregate function, and determining a cost estimate of the aggregate operation according to the aggregate rate.

3. The method of claim 2, wherein determining the selection rate of the filtering condition according to the type of the filtering predicate comprises:
deciding whether an object for calculating the selection rate corresponding to the type of the filtering predicate is available, and in response to determining that the object for calculating the selection rate is unavailable, determining the selection rate of the filtering condition as $S=1/a$ specified value.

4. The method of claim 3, wherein deciding whether the object for calculating the selection rate corresponding to the type of the filtering predicate is available, and in response to determining that the object for calculating the selection rate is unavailable, determining the selection rate of the filtering condition as $S=1/$the specified value comprises:

in a case where the type of the filtering predicate is an identity predicate, deciding whether a number of distinct values of the filtering operation is available, and in response to determining that the number of distinct values of the filtering operation is unavailable, determining the selection rate of the filtering condition as S=1/the specified value;

in a case where the type of the filtering predicate is a range predicate, in response to determining that an extreme value or a number of distinct values in a field of the filtering predicate is unavailable, determining the selection rate of the filtering condition as S=1/the specified value; and in a case where the type of the filtering predicate is a NULL predicate, deciding whether a number of null values in the field of the filtering predicate is available, and in response to determining that the number of null values in the field of the filtering predicate is unavailable, determining the selection rate of the filtering condition as S=1/the specified value.

5. The method of claim 2, wherein determining the selection rate of the filtering condition according to the type of the filtering predicate comprises:

in response to the type of the filtering predicate being LIKE, determining the selection rate of the filtering condition as S=1/a specified value;

in response to the type of the filtering predicate being an AND-cascaded predicate, determining the selection rate of the filtering condition according to a product of selection rates of cascaded predicates and a minimum value of filtering rates of the AND-cascaded predicate; and in response to the type of the filtering predicate being an OR-cascaded predicate, determining the selection rate of the filtering condition according to selection rates of cascaded predicates corresponding to the OR-cascaded predicate.

6. The method of claim 2, before determining the cost estimate of the join operation according to the determined record count of the join result set, comprising:

in response to a number of distinct values in joined fields of a left table and a number of distinct values in joined fields of a right table joined to the left table being unavailable, determining the record count of the join result set based on a join type of the joined fields.

7. The method of claim 6, wherein determining the record count of the join result set based on the join type of the joined fields comprises:

in response to the join type of the joined fields being a join in a primary key-foreign key form, determining the record count of the join result set according to a record count of a foreign key field and a selection rate of a filtering condition of a primary key field;

in response to the join type of the joined fields being an inner join, using a larger value between a record count of the left table and a record count of the right table joined to the left table as the record count of the join result set;

in response to the join type of the joined fields being a cross join, using a product of the record count of the left table and the record count of the right table joined to the left table as the record count of the join result set;

in response to the join type of the joined fields being a left outer join, using the record count of the left table joined to the right table as the record count of the join result set, and in response to the join type of the joined fields being a right outer join, using the record count of the right table joined to the left table as the record count of the join result set; and in response to the join type of the joined fields being a full join, using a sum of the record count of the left table and the record count of the right table joined to the left table as the record count of the join result set.

8. The method of claim 2, wherein determining the aggregate rate of the aggregated fields according to the aggregated fields and the aggregate function comprises:

in response to a set of aggregated fields comprising at least one primary key, determining the aggregate rate $R_{agg}$ of the aggregated fields as $R_{agg}=1$;

in response to the aggregate function corresponding to the aggregated fields being Group By, determining the aggregate rate $R_{agg}$ of the aggregated fields as:

$$R_{agg} = \begin{cases} 1, & n > 6 \\ 1 - \frac{1}{2^n}, & n \leq 6 \end{cases},$$

wherein n is a number of aggregated fields in the set of aggregated fields;

in response to the aggregate function corresponding to the aggregated fields being Rollup, determining the aggregate rate $R_{agg}$ of the aggregated fields as:

$$R_{agg} = \sum_{k=1}^{n} \left(1 - \frac{1}{2^k}\right) = n - 1 + \frac{1}{2^n},$$

wherein n is the number of aggregated fields in the set of aggregated fields, and k is a positive integer; and in response to the aggregate function corresponding to the aggregated fields being Cube, determining the aggregate rate $R_{agg}$ of the aggregated fields as:

$$R_{agg} = \sum_{k=1}^{n} C_n^k \times \left(1 - \frac{1}{2^k}\right) = 2^n - \sum_{k=0}^{n} C_n^k \times \frac{1}{2^k},$$

wherein n is the number of aggregated fields in the set of aggregated fields, and k is a positive integer.

9. A cost estimation device, comprising one or more processors, the one or more processors configured to:

decide whether acquired statistical information is complete, and in response to determining that the statistical information is incomplete, determine a cost estimation manner of a first operation type, wherein the first operation type is an operation type of an operation tree relying on the statistical information;

determine a first cost estimate of the first operation type based on the cost estimation manner;

determine an accumulative cost estimate of the operation tree according to the first cost estimate and a second cost estimate of a second operation type, wherein the second operation type is an operation type of the operation tree not relying on the statistical information; and optimize an execution plan corresponding to a structured query language (SQL) statement according to the accumulative cost estimate;

wherein the first operation type comprises a table scan operation, a filtering operation, a join operation and an aggregate operation; and wherein the second operation type comprises a projection operation and a selection operation.

10. The device of claim 9, wherein the one or more processors is further configured to:
   determine a cost estimate of the table scan operation according to a record count of a data set;
   determine a selection rate of a filtering condition according to a type of a filtering predicate, and determine a cost estimate of the filtering operation according to the selection rate;
   determine a cost estimate of the join operation according to a determined record count of a join result set; and
   determine an aggregate rate of aggregated fields according to the aggregated fields and an aggregate function, and determine a cost estimate of the aggregate operation according to the aggregate rate.

11. The device of claim 10, wherein the one or more processors is further configured to:
   decide whether an object for calculating the selection rate corresponding to the type of the filtering predicate is available, and in response to determining that the object for calculating the selection rate is unavailable, determine the selection rate of the filtering condition as S=1/a specified value.

12. The device of claim 11, wherein the one or more processors is further configured to:
   in a case where the type of the filtering predicate is an identity predicate, decide whether a number of distinct values of the filtering operation is available, and in response to determining that the number of distinct values of the filtering operation is unavailable, determine the selection rate of the filtering condition as S=1/the specified value;
   in a case where the type of the filtering predicate is a range predicate, in response to determining that an extreme value or a number of distinct values in a field of the filtering predicate is unavailable, determine the selection rate of the filtering condition as S=1/the specified value; and
   in a case where the type of the filtering predicate is a NULL predicate, decide whether a number of null values in the field of the filtering predicate is available, and in response to determining that the number of null values in the field of the filtering predicate is unavailable, determine the selection rate of the filtering condition as S=1/the specified value.

13. The device of claim 10, wherein the one or more processors is further configured to:
   in response to the type of the filtering predicate being LIKE, determine the selection rate of the filtering condition as S=1/a specified value;
   in response to the type of the filtering predicate being an AND-cascaded predicate, determine the selection rate of the filtering condition according to a product of selection rates of cascaded predicates and a minimum value of filtering rates of the AND-cascaded predicate; and
   in response to the type of the filtering predicate being an OR-cascaded predicate, determine the selection rate of the filtering condition according to selection rates of cascaded predicates corresponding to the OR-cascaded predicate.

14. The device of claim 10, wherein the one or more processors is further configured to:
   in response to a number of distinct values in joined fields of a left table and a number of distinct values in joined fields of a right table joined to the left table being unavailable, determine the record count of the join result set based on a join type of the joined fields.

15. The device of claim 14, wherein the one or more processors is further configured to:
   in response to the join type of the joined fields being a join in a primary key-foreign key form, determine the record count of the join result set according to a record count of a foreign key field and a selection rate of a filtering condition of a primary key field;
   in response to the join type of the joined fields being an inner join, use a larger value between a record count of the left table and a record count of the right table joined to the left table as the record count of the join result set;
   in response to the join type of the joined fields being a cross join, use a product of the record count of the left table and the record count of the right table joined to the left table as the record count of the join result set;
   in response to the join type of the joined fields being a left outer join, use the record count of the left table joined to the right table as the record count of the join result set, and in response to the join type of the joined fields being a right outer join, use the record count of the right table joined to the left table as the record count of the join result set; and
   in response to the join type of the joined fields being a full join, use a sum of the record count of the left table and the record count of the right table joined to the left table as the record count of the join result set.

16. The device of claim 10, wherein the one or more processors is further configured to:
   in response to a set of aggregated fields comprising at least one primary key, determine the aggregate rate $R_{agg}$ of the aggregated fields as $R_{agg}=1$;
   in response to the aggregate function corresponding to the aggregated fields being Group By, determine the aggregate rate $R_{agg}$ of the aggregated fields as:

$$R_{agg} = \begin{cases} 1, & n > 6 \\ 1 - \frac{1}{2^n}, & n \leq 6 \end{cases},$$

wherein n is a number of aggregated fields in the set of aggregated fields;
   in response to the aggregate function corresponding to the aggregated fields being Rollup, determine the aggregate rate $R_{agg}$ of the aggregated fields as:

$$R_{agg} = \sum_{k=1}^{n}\left(1 - \frac{1}{2^k}\right) = n - 1 + \frac{1}{2^n},$$

wherein n is the number of aggregated fields in the set of aggregated fields, and k is a positive integer; and
   in response to the aggregate function corresponding to the aggregated fields being Cube, determine the aggregate rate $R_{agg}$ of the aggregated fields as:

$$R_{agg} = \sum_{k=1}^{n} C_n^k \times \left(1 - \frac{1}{2^k}\right) = 2^n - \sum_{k=0}^{n} C_n^k \times \frac{1}{2^k},$$

wherein n is the number of aggregated fields in the set of aggregated fields, and k is a positive integer.

17. A computing based device, comprising:
a processor, and
a memory, which is configured to store computer-executable instructions which, when executed, cause the processor to:
- decide whether acquired statistical information is complete, and in response to determining that the statistical information is incomplete, determine a cost estimation manner of a first operation type, wherein the first operation type is an operation type of an operation tree relying on the statistical information;
- determine a first cost estimate of the first operation type based on the cost estimation manner;
- determine an accumulative cost estimate of the operation tree according to the first cost estimate and a second cost estimate of a second operation type, wherein the second operation type is an operation type of the operation tree not relying on the statistical information; and
- optimize an execution plan corresponding to a structured query language (SQL) statement according to the accumulative cost estimate;

wherein the first operation type comprises a table scan operation, a filtering operation, a join operation and an aggregate operation; and wherein the second operation type comprises a projection operation and a selection operation.

* * * * *